(12) United States Patent
She et al.

(10) Patent No.: US 11,981,161 B1
(45) Date of Patent: May 14, 2024

(54) ALL-STEEL TIRE WITH 100% DEFINITE ELONGATIONS OF UPPER AND LOWER TREADS BEING INTERRELATED TO EACH OTHER

(71) Applicant: GUIZHOU TYRE CO., LTD., Guiyang (CN)

(72) Inventors: Tenglong She, Guiyang (CN); Gege Huang, Guiyang (CN); Daiqiang Li, Guiyang (CN); Kan Heng, Guiyang (CN)

(73) Assignee: GUIZHOU TYRE CO., LTD., Guiyang (CN)

( * ) Notice: Subject to any disclaimer, the term of this patent is extended or adjusted under 35 U.S.C. 154(b) by 0 days.

(21) Appl. No.: 18/230,800

(22) Filed: Aug. 7, 2023

(30) Foreign Application Priority Data

Dec. 29, 2022 (CN) .......................... 202211709484.8

(51) Int. Cl.
*B60C 1/00* (2006.01)
*C08J 3/22* (2006.01)
(Continued)

(52) U.S. Cl.
CPC .............. *B60C 1/0016* (2013.01); *C08J 3/22* (2013.01); *C08K 3/011* (2018.01); *C08K 3/04* (2013.01); *C08K 3/06* (2013.01); *C08K 3/22* (2013.01); *C08K 5/09* (2013.01); *C08K 5/541* (2013.01); *C08L 7/00* (2013.01); *C08J 2307/00* (2013.01); *C08J 2409/00* (2013.01);
(Continued)

(58) Field of Classification Search
CPC ....... B60C 1/0016; C08J 3/22; C08J 2307/00; C08J 2409/00; C08J 2491/06; C08K 3/011; C08K 3/04; C08K 3/06; C08K 3/22; C08K 5/09; C08K 5/541; C08K 2003/2296; C08K 2201/014; C08L 7/00; C08L 2205/03; C08L 2310/00
See application file for complete search history.

(56) References Cited

FOREIGN PATENT DOCUMENTS

| CN | 101792545 A | 8/2010 |
| CN | 102963216 A | 3/2013 |

(Continued)

OTHER PUBLICATIONS

English language machine translation for CN 114425823 (Year: 2022).*

(Continued)

*Primary Examiner* — Angela C Scott
(74) *Attorney, Agent, or Firm* — Nitin Kaushik

(57) ABSTRACT

The present disclosure provides an all-steel tire with 100% definite elongations of an upper tread and a lower tread being interrelated to each other. The all-steel tire of the present disclosure includes a lower tread rubber layer B and an upper tread rubber layer A. Through repeated multiple experiments of the applicant, when a ratio of stresses at 100% definite elongation of the upper tread rubber layer A to the lower tread rubber layer B is (0.7-0.8):1, and the 100% stress at definite elongation of the lower tread rubber layer B is 3.2-5.5 Mpa, it can be ensured that after any tread of the tire is subjected to performance adjustment, the performance balance of the whole tire crown is continuously maintained, so that no new problem is generated after the tread performance of the all-steel radial tire is improved.

4 Claims, 3 Drawing Sheets

(51) Int. Cl.
*C08K 3/011* (2018.01)
*C08K 3/04* (2006.01)
*C08K 3/06* (2006.01)
*C08K 3/22* (2006.01)
*C08K 5/09* (2006.01)
*C08K 5/541* (2006.01)
*C08L 7/00* (2006.01)

(52) U.S. Cl.
CPC ... *C08J 2491/06* (2013.01); *C08K 2003/2296* (2013.01); *C08K 2201/014* (2013.01); *C08L 2205/03* (2013.01); *C08L 2310/00* (2013.01)

(56) References Cited

FOREIGN PATENT DOCUMENTS

| | | | | |
|---|---|---|---|---|
| CN | 103129319 A | | 6/2013 | |
| CN | 110408088 A | * | 11/2019 | ........... B60C 1/0016 |
| CN | 114425823 A | * | 5/2022 | |

OTHER PUBLICATIONS

English language machine translation for CN 110408088 (Year: 2019).*

* cited by examiner

ALL-STEEL TIRE WITH 100% DEFINITE ELONGATIONS OF UPPER AND LOWER TREADS BEING INTERRELATED TO EACH OTHER

CROSS-REFERENCE TO RELATED APPLICATIONS

The application claims priority to Chinese patent application No. 2022117094848, filed on Dec. 29, 2022, the entire contents of which are incorporated herein by reference.

TECHNICAL FIELD

The present disclosure relates to the technical field of all-steel radial tires, in particular to an all-steel tire with 100% definite elongations of upper and lower treads interrelated to each other.

BACKGROUND

Since the birth of all-steel radial tires, major manufacturers at home and abroad have done countless work in improving tire performances, especially in improving tire tread formulas. However, the improvement work made in the past has only focused on the performance improvement of a single part, but the matching problem with the performances of adjacent parts after the performance improvement of the part is ignored. It is well-known that the all-steel radial tire is composed of a plurality of parts. If the performance improvement of a single part or tread is focused when performing improvements, the balance of the overall performance of the original design scheme will inevitably be broken by the change in performance of this single part, resulting in a new problem. However, if the adjacent part can be matched in relation and adjusted in a coordinated manner, and the balance of the entire tire can be maintained, it will be possible to solve the problem while improving the performance without breaking the balance of the overall performance of the original tire and causing a new problem.

Based on the new problem caused by the current improvement of the single upper tread formula of the tire tread, the balance with the overall performance of the original lower tread and even of the entire tire is broken, so further improvements are required.

SUMMARY

In view of this, the present disclosure provides an all-steel tire with 100% definite elongations of upper and lower treads being interrelated to each other to solve the technical defects existing in the prior art.

In a first aspect, the present disclosure provides an all-steel tire with 100% definite elongations of upper and lower treads being interrelated to each other, including an upper tread rubber layer A and a lower tread rubber layer B which are superposed in sequence, wherein a ratio of stresses at 100% definite elongation of the upper tread rubber layer A to the lower tread rubber layer B is (0.7 to 0.8):1.

Preferably, the stress at 100% definite elongation of the lower tread rubber layer B of the all-steel tire is 3.2-5.5 MPa.

Preferably, materials used in the upper tread rubber layer A of the all-steel tire include the following components in parts by weight:

20 to 80 parts of natural rubber, 80 to 20 parts of cis-butadiene rubber, 40 to 70 parts of carbon black, 0 to 30 parts of white carbon black, 1 to 5 parts of zinc oxide, 0.5 to 3.5 parts of stearic acid, 1 to 5 parts of microcrystalline wax, 1 to 5 parts of anti-aging agent, 3 to 10 parts of softener, 0 to 6 parts of silane coupling agent, 1 to 5 parts of sulfur, and 1 to 4 parts of accelerator.

Preferably, materials used in the lower tread rubber layer B of the all-steel tire include the following components in parts by weight:

50-100 parts of natural rubber, 0 to 50 parts of cis-butadiene rubber, 20 to 40 parts of carbon black, 5 to 20 parts of white carbon black, 1 to 5 parts of zinc oxide, 1 to 4 parts of stearic acid, 0.5 to 2 parts of microcrystalline wax, 2 to 4 parts of anti-aging agent, 1 to 4 parts of silane coupling agent, 1 to 3 parts of softener, 2 to 5 parts of sulfur, and 2 to 4 parts of accelerator.

Preferably, a ratio of stresses at 100% definite elongation of the upper tread rubber layer A to the lower tread rubber layer B of the all-steel tire is 0.75:1.

Preferably, a method for preparing materials used in the upper tread rubber layer A of the all-steel tire include the following steps:

adding the natural rubber and the cis-butadiene rubber to a meshing mixer and mixing, then adding the zinc oxide, the carbon black, the white carbon black and the silane coupling agent, continuing to mix and discharging rubber to obtain a section AI of rubber masterbatch;

adding the section AI of rubber masterbatch, the stearic acid, the microcrystalline wax and the softener to the meshing mixer, mixing and discharging rubber to obtain a section AII of rubber masterbatch; and adding the section AII of rubber masterbatch to the meshing mixer and mixing, then adding the sulfur, the accelerator and the anti-aging agent, continuing to mix, and discharging rubber to obtain final mixed rubber A, i.e., the material used in the upper tread rubber layer A.

Preferably, a method for preparing materials used in the lower tread rubber layer B of the all-steel tire include the following steps:

adding the natural rubber and the cis-butadiene rubber to a meshing mixer and mixing, then adding the zinc oxide, the carbon black, the white carbon black and the silane coupling agent, continuing to mix and discharging rubber to obtain a section BI of rubber masterbatch;

adding the section BI of rubber masterbatch, the stearic acid, the microcrystalline wax and the softener to the meshing mixer, mixing and discharging rubber to obtain a section BII of rubber masterbatch; and adding the section BII of rubber masterbatch to the meshing mixer and mixing, then adding the sulfur, the accelerator and the anti-aging agent, continuing to mix, and discharging rubber to obtain final mixed rubber B, i.e., the material used in the lower tread rubber layer B.

Preferably, materials used in the upper tread rubber layer A of the all-steel tire include the following components in parts by weight:

60 parts of natural rubber, 40 parts of cis-butadiene rubber, 45 parts of carbon black, 15 parts of white carbon black, 4 parts of zinc oxide, 2.5 parts of stearic acid, 1.5 parts of microcrystalline wax, 3.5 parts of anti-aging agent, 5 parts of softener, 3 parts of silane coupling agent, 3.5 parts of sulfur, and 1.5 parts of accelerator.

Preferably, materials used in the lower tread rubber layer B of the all-steel tire include the following components in parts by weight:

100 parts of natural rubber, 40 parts of carbon black, 20 parts of white carbon black, 5 parts of zinc oxide, 3 parts of stearic acid, 0.5 part of microcrystalline wax, 3 parts of anti-aging agent, 4 parts of silane coupling agent, 2 parts of softener, 3.5 parts of sulfur, and 2.5 parts of accelerator.

Compared with the prior art, the all-steel tire with 100% definite elongations of the upper tread and the lower tread being interrelated to each other has the following beneficial effect.

1. The all-steel tire of the present disclosure includes a lower tread rubber layer B and an upper tread rubber layer A. Through repeated multiple experiments of the applicant, when a ratio of stresses at 100% definite elongation of the upper tread rubber layer A to the lower tread rubber layer B is (0.7-0.8): 1, it can be ensured that after any tread of the tire is subjected to performance adjustment, the performance balance of the whole tire crown is continuously maintained, so that no new problem is generated after the tread performance of the all-steel radial tire is improved.

BRIEF DESCRIPTION OF DRAWINGS

In order to more clearly illustrate the technical solutions in the embodiments of the present application and in the prior art, the accompanying drawings required to be used in the description of the embodiments or the prior art are described below briefly. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The technical solutions in the embodiments of the present disclosure will be described clearly and completely in conjunction with the embodiments of the present disclosure. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
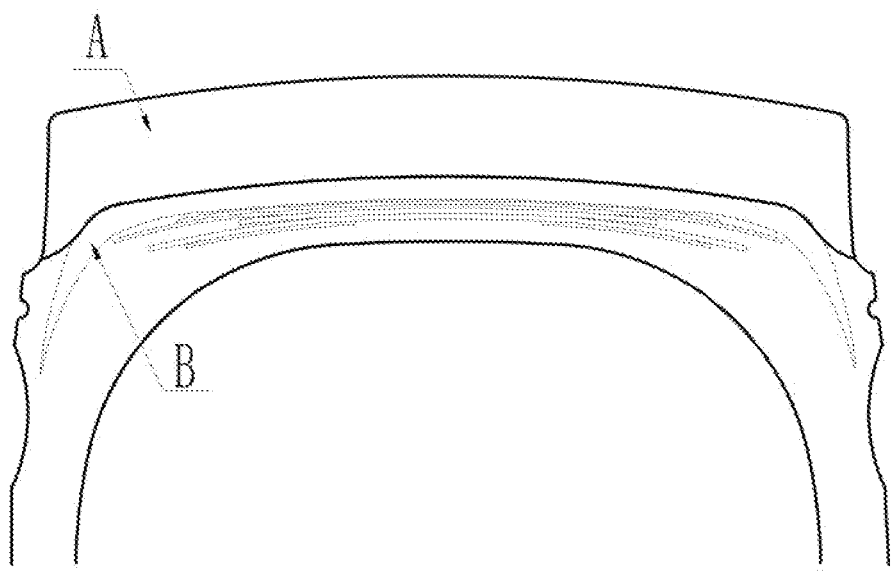
FIG. 1 is a schematic structural diagram of two layers of treads of an all-steel tire of the present disclosure.

The present application provides an all-steel tire with 100% definite elongations of upper and lower treads being interrelated to each other. As shown in FIG. 1, the all-steel tire includes an upper tread rubber layer A and a lower tread rubber layer B which are superposed in sequence, wherein a ratio of stresses at 100% definite elongation of the upper tread rubber layer A to the lower tread rubber layer B is (0.7 to 0.8):1.

The technical problem to be solved by the present application is to solve the new problem caused by the breakage of balance of the overall performance of the original lower tread and even of the entire tire during the improvement of a single upper tread formula. The all-steel tire provided by the present disclosure includes a lower tread rubber layer B and an upper tread rubber layer A. Through repeated multiple experiments of the applicant, it is found that when a ratio of stresses at 100% definite elongation of the upper tread rubber layer A to the lower tread rubber layer B is (0.7-0.8): 1, it can be ensured that after the treads of the tire are subjected to performance adjustment, the performance balance of the entire tire is continuously maintained, so that no new problem is generated after the tread performance of the all-steel radial tire is improved. The two layers of treads of the all-steel tire in the present application eliminates the new problem caused by the breakage of the balance of the overall performance of the tire after the performances of a single part are adjusted. Specifically, for the sake of the present application, by controlling a ratio of stresses at 100% definite elongation of the upper tread rubber layer A to the lower tread rubber layer B, and finding the optimal stress range at 100% definite elongation of the key lower tread rubber layer B, the balance of the overall performance of the tire is characterized by two different test methods of national standard durability and high-speed durability of the tire.

In some embodiments, the stress at 100% definite elongation of the lower tread rubber layer B is 3.2-5.5 MPa.

In some embodiments, materials used in the upper tread rubber layer A include the following components in parts by weight:

20 to 80 parts of natural rubber, 80 to 20 parts of cis-butadiene rubber, 40 to 70 parts of carbon black, 0 to 30 parts of white carbon black, 1 to 5 parts of zinc oxide, 0.5 to 3.5 parts of stearic acid, 1 to 5 parts of microcrystalline wax, 1 to 5 parts of anti-aging agent, 3 to 10 parts of softener, 0 to 6 parts of silane coupling agent, 1 to 5 parts of sulfur, and 1 to 4 parts of accelerator.

In some embodiments, materials used in the lower tread rubber layer B include the following components in parts by weight:

50-100 parts of natural rubber, 0 to 50 parts of cis-butadiene rubber, 20 to 40 parts of carbon black, 5 to 20 parts of white carbon black, 1 to 5 parts of zinc oxide, 1 to 4 parts of stearic acid, 0.5 to 2 parts of microcrystalline wax, 2 to 4 parts of anti-aging agent, 1 to 4 parts of silane coupling agent, 1 to 3 parts of softener, 2 to 5 parts of sulfur, and 2 to 4 parts of accelerator.

In some embodiments, a ratio of the stresses at 100% definite elongation of the upper tread rubber layer A to the lower tread rubber layer B is 0.75:1.

In some embodiments, a method for preparing materials used in the upper tread rubber layer A include the following steps:
    S1, adding the natural rubber and the cis-butadiene rubber to a meshing mixer and mixing, then adding the zinc oxide, the carbon black, the white carbon black and the silane coupling agent, continuing to mix and discharging rubber to obtain a section AI of rubber masterbatch;
    S2, adding the section AI of rubber masterbatch, the stearic acid, the microcrystalline wax and the softener to the meshing mixer, mixing and discharging rubber to obtain a section AII of rubber masterbatch; and
    S3, adding the section AII of rubber masterbatch to the meshing mixer and mixing, then adding the sulfur, the accelerator and the anti-aging agent, continuing to mix, and discharging rubber to obtain final mixed rubber A, i.e., the material used in the upper-layer tread rubber layer A.

Specifically, in some embodiments, a method for preparing materials used in the upper tread rubber layer A include the following steps:
    S1, adding the natural rubber and the cis-butadiene rubber to a meshing mixer and mixing, setting a rotation speed of the mixer to 30 to 45 rpm, mixing 20 to 30 s, then adding the zinc oxide, the carbon black, the white carbon black and the silane coupling agent, continuing to mix for 120 to 130 s, and discharging rubber to obtain a section AI of rubber masterbatch, wherein compared with a traditional shear mixer, the meshing mixer is more conducive to the dispersion of the rubber and the control over the temperature of the mixed rubber, and the section A of rubber masterbatch is aimed to control the crosslinking degree of the white carbon black and the silane coupling agent at a reasonable level;

S2, adding the section AI of rubber masterbatch, the stearic acid, the microcrystalline wax and the softener to the meshing mixer, setting a rotation speed of the mixer to 40 to 50 rpm, mixing for 125 to 135 s, lifting a bolt and holding for 15 to 25 s, then pressing the bolt and mixing for 190 to 210 s, and then discharging rubber to obtain a section AII of rubber masterbatch, wherein the section AII of rubber masterbatch is aimed to supplement mixing and improve the dispersity of the carbon black; and S3, adding the section AII of rubber masterbatch to the meshing mixer, setting a rotation speed of the mixer to 25 to 35 rpm, mixing for 60 to 70 s, then adding the sulfur, the accelerator and the anti-aging agent, and continuing to mix for 130 to 140 s, lifting a bolt, then pressing the bolt and melting for 190 to 200 s, and discharging rubber to obtain final mixed rubber A, i.e., the material used in the upper tread rubber layer A.

In some embodiments, a method for preparing materials used in the lower tread rubber layer B include the following steps:

S1, adding the natural rubber and the cis-butadiene rubber to a meshing mixer and mixing, then adding the zinc oxide, the carbon black, the white carbon black and the silane coupling agent, continuing to mix and discharging rubber to obtain a section BI of rubber masterbatch;

S2, adding the section BI of rubber masterbatch, the stearic acid, the microcrystalline wax and the softener to the meshing mixer, mixing and discharging rubber to obtain a section BII of rubber masterbatch; and S3, adding the section BII of rubber masterbatch to the meshing mixer and mixing, then adding the sulfur, the accelerator and the anti-aging agent, continuing to mix, and discharging rubber to obtain final mixed rubber B, i.e., the material used in the lower tread rubber layer B.

Specifically, in some embodiments, a method for preparing materials used in the lower tread rubber layer B include the following steps:

S1, adding the natural rubber and the cis-butadiene rubber to a meshing mixer, setting a rotation speed of the mixer to 35 to 45 rpm, mixing for 20 to 30 s, then adding the zinc oxide, the carbon black, the white carbon black and the silane coupling agent, continuing to mix for 120 to 130 s, and then discharging rubber to obtain a section BI of rubber masterbatch;

S2, adding the section BI of rubber masterbatch, the stearic acid, the microcrystalline wax and the softener to the meshing mixer, setting a rotation speed of the mixer to 40 to 50 rpm, mixing for 125 to 135 s, lifting a bolt and holding for 15 to 25 s, then pressing the bolt and mixing for 190 to 210 s, and then discharging rubber to obtain a section BII of rubber masterbatch; and S3, adding the section BII of rubber masterbatch to the meshing mixer, setting a rotation speed of the mixer to 25 to 35 rpm, mixing for 60 to 70 s, then adding the sulfur, the accelerator and the anti-aging agent, continuing to mix for 130 to 140 s, lifting a bolt, then pressing the bolt and melting for 190 to 200 s, and discharging rubber to obtain final mixed rubber B, i.e., the material used in the lower tread rubber layer B.

In some embodiments, materials used in the upper tread rubber layer A include the following components in parts by weight:

60 parts of natural rubber, 40 parts of cis-butadiene rubber, 45 parts of carbon black, 15 parts of white carbon black, 4 parts of zinc oxide, 2.5 parts of stearic acid, 1.5 parts of microcrystalline wax, 3.5 parts of anti-aging agent, 5 parts of softener, 3 parts of silane coupling agent, 3.5 parts of sulfur, and 1.5 parts of accelerator.

In some embodiments, materials used in the lower tread rubber layer B include the following components in parts by weight:

100 parts of natural rubber, 40 parts of carbon black, 20 parts of white carbon black, 5 parts of zinc oxide, 3 parts of stearic acid, 0.5 part of microcrystalline wax, 3 parts of anti-aging agent, 4 parts of silane coupling agent, 2 parts of softener, 3.5 parts of sulfur, and 2.5 parts of accelerator.

Specifically, a method for preparing the all-steel tire of the present application includes the following steps: preparing a lower tread rubber layer B and an upper tread rubber layer A sequentially on a tread base layer. A method for preparing the lower tread rubber layer B includes: performing extrusion molding on the materials used in the lower tread rubber layer B to prepare the lower tread rubber layer B. A method for preparing the upper tread rubber layer A includes: performing extrusion molding on the materials used in the upper tread rubber layer A to prepare the upper tread rubber layer A.

The all-steel tire of the present application is described below in conjunction with specific examples. This section further describes the content of the present disclosure in conjunction with specific examples, but should not be understood as a limitation of the present disclosure. If not specifically specified, the technical means employed in the embodiments are conventional means well known to those skilled in the art. Unless otherwise specified, reagents, methods and apparatuses employed in the present disclosure are conventional reagents, methods and apparatuses in the art.

Example 1

An embodiment of the present application provides an all-steel tire with 100% definite elongations of upper and lower treads being interrelated to each other. The all-steel tire includes an upper tread rubber layer A and a lower tread rubber layer B which are superimposed sequentially, wherein materials used in the upper tread rubber layer A are of a formula shown in Table 1 below, and materials used in the lower tread rubber layer B are of a formula shown in Table 2 below.

TABLE 1

Formula of materials used in the upper tread rubber layer A
(data in the table are in all parts by weight)

| Raw material | Ordinary formula A | Formula 1 | Formula 2 | Formula 3 |
| --- | --- | --- | --- | --- |
| Natural rubber | 90 | 70 | 60 | 30 |
| Cis-butadiene rubber | 10 | 30 | 40 | 70 |
| Carbon black | 75 | 55 | 45 | 25 |
| White carbon black | 0 | 20 | 15 | 30 |
| Zinc oxide | 6 | 3.5 | 4 | 5 |
| Stearic acid | 1.5 | 2 | 2.5 | 2 |

TABLE 1-continued

Formula of materials used in the upper tread rubber layer A
(data in the table are in all parts by weight)

| Raw material | Ordinary formula A | Formula 1 | Formula 2 | Formula 3 |
|---|---|---|---|---|
| Microcrystalline wax | 3.2 | 2 | 1.5 | 1.5 |
| Anti-aging agent | 4 | 3.5 | 3.5 | 3.5 |
| Softener | 5 | 6 | 5 | 7 |
| Silane coupling agent | 0 | 4 | 3 | 6 |
| Sulfur | 4 | 3.5 | 3.5 | 3.5 |
| Accelerator | 1.8 | 2 | 1.5 | 2 |

TABLE 2

Formula of materials used in the lower tread rubber layer B
(data in the table are in all parts by weight)

| Raw material | Ordinary formula B | Formula 4 | Formula 5 | Formula 6 |
|---|---|---|---|---|
| Natural rubber | 50 | 100 | 50 | 80 |
| Cis-butadiene rubber | 50 | 0 | 50 | 20 |
| Carbon black | 25 | 40 | 45 | 55 |
| White carbon black | 35 | 20 | 15 | 5 |
| Zinc oxide | 2 | 5 | 3 | 3 |
| Stearic acid | 2 | 3 | 2 | 2 |
| Microcrystalline wax | 2 | 0.5 | 2 | 1 |
| Anti-aging agent | 4 | 3 | 4 | 4 |
| Softener | 5 | 2 | 2 | 1 |
| Silane coupling agent | 7 | 4 | 3 | 1 |
| Sulfur | 3 | 3.5 | 2.5 | 3 |
| Accelerator | 2.3 | 2.5 | 2.5 | 2.3 |

A specific method for preparing the materials used in the upper tread rubber layer A includes:

S1, adding the natural rubber and the cis-butadiene rubber to a meshing mixer, setting a rotation speed of the mixer to 40 rpm, mixing for 25 s, then adding the zinc oxide, the carbon black, the white carbon black and the silane coupling agent, continuing to mix for 125 s, and then discharging rubber to obtain a section of rubber masterbatch;

S2, adding the section AI of rubber masterbatch, the stearic acid, the microcrystalline wax and the softener to the meshing mixer, setting a rotation speed of the mixer to 45 rpm, mixing for 130 s, lifting a bolt and holding for 20 s, then pressing the bolt and mixing for 200 s, and then discharging rubber to obtain a section AII of rubber masterbatch; and S3, adding the section AII of rubber masterbatch to the meshing mixer, setting a rotation speed of the mixer to 30 rpm, mixing for 65 s, then adding the sulfur, the accelerator and the anti-aging agent, continuing to mix for 135 s, lifting a bolt, then pressing the bolt and melting for 195 s, and discharging rubber to obtain final mixed rubber A, i.e., the material used in the upper tread rubber layer A.

A method for preparing the materials used in the lower tread rubber layer B includes:

S1, adding the natural rubber and the cis-butadiene rubber to a meshing mixer, setting a rotation speed of the mixer to 40 rpm, mixing for 25 s, then adding the zinc oxide, the carbon black, the white carbon black and the silane coupling agent, continuing to mix for 125 s, and then discharging rubber to obtain a section BI of rubber masterbatch;

S2, adding the section BI of rubber masterbatch, the stearic acid, the microcrystalline wax and the softener to the meshing mixer, setting a rotation speed of the mixer to 45 rpm, mixing for 130 s, lifting a bolt and holding for 20 s, then pressing the bolt and mixing for 200 s, and then discharging rubber to obtain a section BII of rubber masterbatch; and S3, adding the four sections of rubber masterbatch to the meshing mixer, setting a rotation speed of the mixer to 30 rpm, mixing for 65 s, then adding the sulfur, the accelerator and the anti-aging agent, and continuing to mix for 135 s, lifting a bolt, then pressing the bolt and melting for 195 s, and discharging rubber to obtain final mixed rubber B, i.e., the material used in the lower tread rubber layer B.

The main properties of the materials used in the upper tread rubber layer A composed of different formulas in Table 1 are shown in Table 3.

TABLE 3

The properties of the materials used in the upper tread rubber layer A composed of different formulas

| Physical properties | Ordinary formula A | Formula 1 | Formula 2 | Formula 3 |
|---|---|---|---|---|
| Vulcanization condition: 151° C. × 30 min | | | | |
| Stress at 100% definite elongation | 5.1 | 4.3 | 3.15 | 2.89 |
| Stress at 300% definite elongation | 13.5 | 13.3 | 11.8 | 11.2 |
| Tear-off tensile strength (MPa) | 27.4 | 27.1 | 26.7 | 25.7 |

The main properties of the materials used in the lower tread rubber layer B composed of different formulas in Table 2 are shown in Table 4.

TABLE 4

The properties of the materials used in the lower tread rubber layer B composed of different formulas

| Physical properties | Ordinary formula B | Formula 4 | Formula 5 | Formula 6 |
|---|---|---|---|---|
| Vulcanization condition: 151° C. × 30 min | | | | |
| Stress at 100% definite elongation | 3.7 | 4.2 | 3.4 | 2.6 |
| Stress at 300% definite elongation | 11.3 | 12.6 | 10.6 | 9.8 |
| Tear-off tensile strength (MPa) | 23.4 | 24.3 | 23.1 | 21.5 |

When the all-steel tire of the present application has two layers of tread, wherein the materials used in the upper tread rubber layer A are of a formula shown in Table 1, and the materials used in the lower tread rubber layer B are of a formula shown in Table 2, the entire 12R22.5 all-steel tire is finally formed using the above formula of the two layers of tread (this tire of the present application has the exactly same structure as the conventional tire, except for using the two tread layers), and the all-steel tire is subjected to high-speed durability test and national standard durability test. The results are shown in FIGS. 2 to 3.

Figure 2:
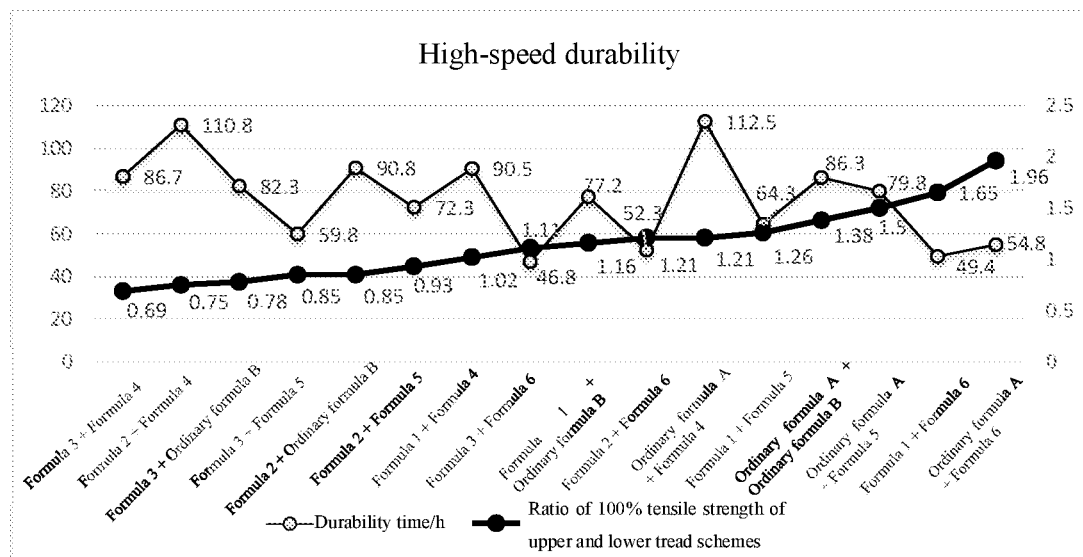
FIG. 2 is a high-speed durability test diagram of the all-steel tire of the present disclosure.
Figure 3:
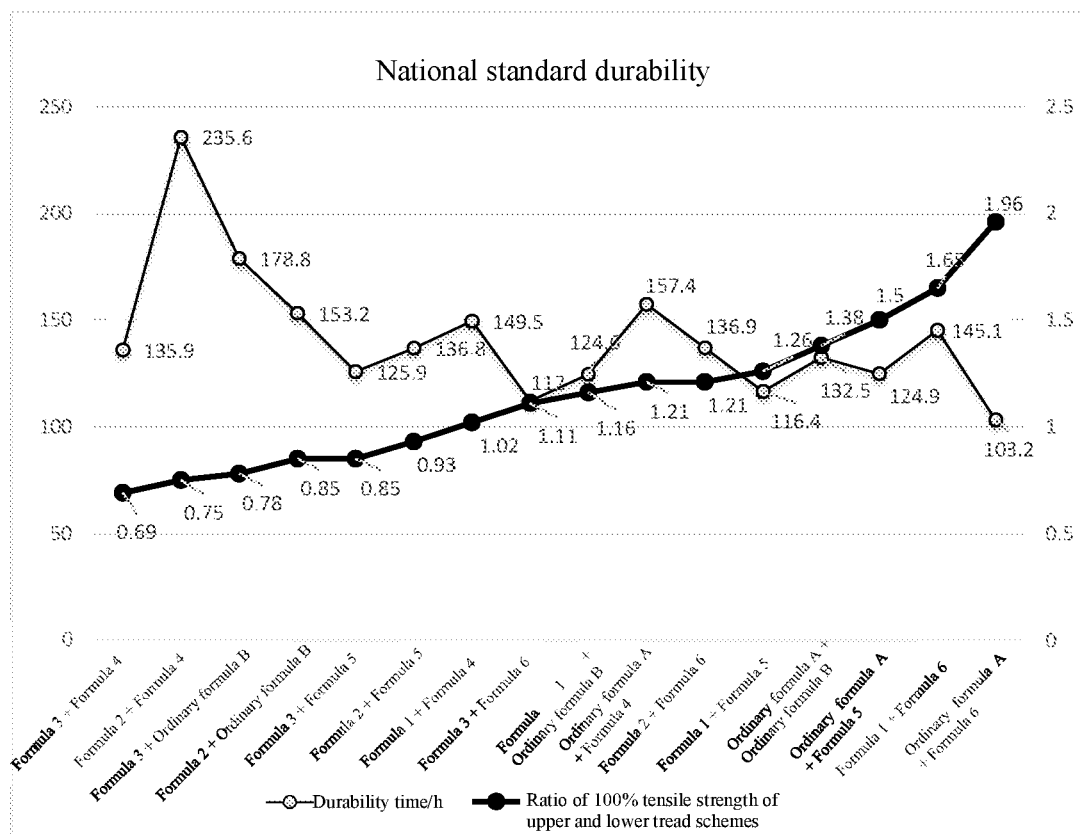
FIG. 3 is a national standard durability test diagram of the all-steel tire of the present disclosure.

It can be seen from FIG. 2 that when the materials used in the upper tread rubber layer A are of an ordinary formula A, and the materials used in the lower tread rubber layer B are of a formula 4, a ratio of 100% tensile strength (i.e. 100% stress at definite elongation) of the upper tread rubber layer A to the lower tread rubber layer B is 1.21:1, and the durability time is 112.5 h; and when the materials used in the upper tread rubber layer A are of a formula 2 and the materials used in the lower tread rubber layer B are of the formula 4, a ratio of 100% tensile strength (i.e. 100% stress at definite elongation) of the upper tread rubber layer A to the lower tread rubber layer B is 0.75:1, and the durability time is 110.8 h;

It can be seen from FIG. 3 that in the national standard durability test, when the materials used in the upper tread rubber layer A are of the formula 2, and the materials used in the lower tread rubber layer B are of the formula 4, a ratio of 100% tensile strength (i.e., 100% stress at definite elongation) of the upper tread rubber layer A to the lower tread rubber layer B is 0.75:1, and the durability time is 235.6 h. This scheme has obvious advantages. That is, when a ratio of stress at 100% definite elongation of the upper tread rubber layer A to stress at 100% definite elongation of the lower tread rubber layer B is 0.75:1, a stress range at 100% definite elongation of the lower tread rubber layer B is between 3.2 MPa and 5.5 MPa, and the overall performance balance of the tire is optimal.

The foregoing descriptions are merely preferred embodiments of the present disclosure, and are not intended to limit the present disclosure. Within the spirit and principles of the present disclosure, any modifications, equivalent substitutions, improvements, etc., are within the protection scope of the present disclosure.

What is claimed is:

1. An all-steel tire with 100% definite elongations of upper and lower treads being interrelated to each other, comprising an upper tread rubber layer A and a lower tread rubber layer B which are superposed in sequence, wherein a ratio of stresses at 100% definite elongation of the upper tread rubber layer A to the lower tread rubber layer B is (0.7 to 0.8): 1, wherein materials used in the upper tread rubber layer A comprise the following components in parts by weight:
   60 parts of the natural rubber, 40 parts of the cis-butadiene rubber, 45 parts of the carbon black, 15 parts of the white carbon black, 4 parts of the zinc oxide, 2.5 parts of the stearic acid, 1.5 parts of the microcrystalline wax, 3.5 parts of the anti-aging agent, 5 parts of the softener, 3 parts of the silane coupling agent, 3.5 parts of the sulfur, and 1.5 parts of the accelerator;
   wherein the materials used in the lower tread rubber layer B comprise the following components in parts by weight:
   100 parts of the natural rubber, 40 parts of the carbon black, 20 parts of the white carbon black, 5 parts of the zinc oxide, 3 parts of the stearic acid, 0.5 part of the microcrystalline wax, 3 parts of the anti-aging agent, 4 parts of the silane coupling agent, 2 parts of the softener, 3.5 parts of the sulfur, and 2.5 parts of the accelerator;
   and the stress at 100% definite elongation of the lower tread rubber layer B is 3.2-5.5 MPa.

2. The all-steel tire with 100% definite elongations of upper and lower treads being interrelated to each other according to claim 1, wherein a ratio of stresses at 100% definite elongation of the upper tread rubber layer A and the lower tread rubber layer B is 0.75:1.

3. The all-steel tire with 100% definite elongations of upper and lower treads being interrelated to each other according to claim 1, wherein a method for preparing the materials used in the upper tread rubber layer A comprise the following steps:
   adding the natural rubber and the cis-butadiene rubber to a meshing mixer and mixing, then adding the zinc oxide, the carbon black, the white carbon black and the silane coupling agent, continuing to mix and discharging rubber to obtain a section AI of rubber masterbatch;
   adding the section AI of rubber masterbatch, the stearic acid, the microcrystalline wax and the softener to the meshing mixer, mixing and discharging rubber to obtain a section AII of rubber masterbatch; and
   adding the section AII of rubber masterbatch to the meshing mixer and mixing, then adding the sulfur, the accelerator and the anti-aging agent, continuing to mix, and discharging rubber to obtain final mixed rubber A, as the material used in the upper tread rubber layer A.

4. The all-steel tire with 100% definite elongations of upper and lower treads being interrelated to each other according to claim 1, wherein a method for preparing the materials used in the lower tread rubber layer B comprises the following steps:
   adding the natural rubber and the cis-butadiene rubber to a meshing mixer and mixing, then adding the zinc oxide, the carbon black, the white carbon black and the silane coupling agent, continuing to mix and discharging rubber to obtain a section BI of rubber masterbatch;
   adding the section BI of rubber masterbatch, the stearic acid, the microcrystalline wax and the softener to the meshing mixer, mixing and discharging rubber to obtain a section BII of rubber masterbatch; and
   adding the section BII of rubber masterbatch to the meshing mixer and mixing, then adding the sulfur, the accelerator and the anti-aging agent, continuing to mix, and discharging rubber to obtain final mixed rubber B, as the material used in the lower tread rubber layer B.

* * * * *